United States Patent
Murray

[11] Patent Number: 5,951,796
[45] Date of Patent: Sep. 14, 1999

[54] TWO COMPONENT POLYURETHANE CONSTRUCTION ADHESIVE AND METHOD OF USING SAME

[75] Inventor: Pat L. Murray, Spring, Tex.

[73] Assignee: Polyfoam Products, Inc., Spring, Tex.

[21] Appl. No.: 08/880,465

[22] Filed: Jun. 23, 1997

[51] Int. Cl.$^6$ .................................................. C08G 18/10
[52] U.S. Cl. ........................... 156/78; 521/159; 521/174
[58] Field of Search .............................. 156/78; 521/159, 521/174

[56] References Cited

U.S. PATENT DOCUMENTS

| | | | |
|---|---|---|---|
| 4,244,901 | 1/1981 | Wencley et al. | 264/46.4 |
| 4,444,976 | 4/1984 | Rabito | 528/60 |
| 4,489,176 | 12/1984 | Kluth et al. | 521/144 |
| 4,636,425 | 1/1987 | Johnson et al. | 423/198 |
| 4,996,812 | 3/1991 | Venable | 52/408 |
| 5,294,358 | 3/1994 | Dantinne et al. | 252/67 |
| 5,296,516 | 3/1994 | Krueger et al. | 521/131 |
| 5,318,996 | 6/1994 | Yu-Hallada et al. | 521/131 |
| 5,362,342 | 11/1994 | Murray et al. | 156/71 |
| 5,409,962 | 4/1995 | Bartlett et al. | 521/88 |
| 5,455,283 | 10/1995 | Green et al. | 521/175 |
| 5,575,871 | 11/1996 | Ryoshi et al. | 156/78 |

*Primary Examiner*—Rachel Gorr
*Attorney, Agent, or Firm*—Akin, Gump, Strauss, Hauer & Feld, LLP

[57] ABSTRACT

A two component polyurethane adhesive and a method of bonding construction materials to various construction substrates. The adhesive being the reaction product of two separate components that are mixed together immediately prior to application upon dispensing onto a substrate. The first part of the adhesive, referred to as the "A-side" is a polyisocyanate prepolymer, preferably a polymeric MDI (methylene diphenyl diisocyanate) based prepolymer. The second part of the adhesive, referred to as the "B-side" is a blend of elastomeric and flexible polyglycols. The adhesive formed by mixing the A-side and B-side components, is a frothing foam that has a consistency such that it does not run or drip when applied to the substrate, that expands upon application to the substrate surface to fill voids or imperfections, that collapses when the material to be bonded is placed in contact with the adhesive, and that has a rapid cure time.

22 Claims, 3 Drawing Sheets

TWO COMPONENT POLYURETHANE CONSTRUCTION ADHESIVE AND METHOD OF USING SAME

1. Field of the Invention

The present invention relates to a two component polyurethane adhesive and a method of bonding various types of construction materials. The two component polyurethane adhesive and method of bonding is particularly adapted for use as a construction adhesive in the installation of ceramic tile, asphalt shingles, roof insulation board, and wood flooring.

2. Background of the Invention

Traditionally, construction materials have been bonded or secured using materials such as mortar and nails. It is widely acknowledged that these materials have many disadvantages. Specifically, mortar can be slow to set and brittle after curing. Nails are susceptible to corrosion from the elements. In addition, foot traffic on flooring materials often causes the nails to loosen and retract from the materials they are meant to hold in place.

To overcome the disadvantages of traditional bonding or securing methods and materials, various adhesives have been applied in construction applications. However, many of these adhesives have had their own disadvantages. Solvent-based adhesives such as urethanes, latex, acrylics, and bitumens are known in the art but these often have a negative environmental impact. The use of these adhesives has been restricted due to emissions of volatile organic compounds (VOCs). In addition, these adhesives generally have a slow cure rate and can be difficult to handle during application. Adhesives containing chlorinated hydrocarbons or ketone based solvents also have significant disadvantages for use in construction because they can be undesirably odorous, present safety hazards, and are also environmentally unfavorable.

The use of moisture cured, single component polyurethane adhesives to bond various types of construction materials also has been known in the prior art. Generally speaking, a single component polyurethane adhesive refers to a composition of polyurethane chemicals that have been pre-mixed and stored in a dry environment. These single component polyurethane adhesives then react with moisture from the air upon application to a substrate. There are many disadvantages of this single component polyurethane adhesive including slow set time, slow cure rate, high cost per pound, limited container quantities, and poor shelf life.

Some two component polyurethane systems have been used as adhesives in certain applications. However, these two component systems have been limited to use in specific applications and have characteristics which limit their applications further. U.S. Pat. No. 4,244,901 discloses a method of bonding wallboard or drywall to its structural members. The '901 method requires high pressure to apply an expanding polyurethane foam and discloses the use of a "hard" fluorocarbon blowing agent which is not environmentally safe. The high pressure application of this foam, as well as the expansion properties of the foam itself, make this method impractical for application to small area jobs such as installation of ceramic floor tile.

U.S. Pat. No. 4,636,425 discloses a method of bonding with a two component polyurethane system in which a fine mist of a foamable liquid polyurethane is sprayed onto a surface to form discrete droplets or pods of adhesive. This method requires the use of high pressure which also makes the systems impractical for use on a small scale. Additionally, this method discloses the use of a "hard" fluorocarbon, R-11 as the blowing agent.

U.S. Pat. No. 5,362,342 discloses a two component polyurethane adhesive for use in applying roof tiles to a roof substrate. This method discloses application of a stream of adhesive on the roof substrate which expands on the roof substrate. The thickness of this adhesive foam does not significantly diminish after coming into contact with the roof tile which may limit application to other construction materials.

It would be desirable to have an environmentally friendly adhesive and method of bonding that could be used in a broad variety of construction applications and that could be used with low pressure, portable dispensing equipment. It would be particularly desirable if the adhesive could expand to fill voids or imperfections between the surfaces being bonded, but would then collapse allowing a thin layer of adhesive to bond the construction materials together. Further, it would be desirable if the adhesive would have a rapid cure time and would produce a strong bond that retained some elasticity.

SUMMARY OF THE INVENTION

The present invention is a two component polyurethane adhesive and a method of bonding construction materials to various construction substrates. The adhesive of the present invention is the reaction product of two separate components that are mixed together immediately prior to application or dispensing onto a substrate. The first part of the adhesive, referred to as the "A-side," is a polyisocyanate prepolymer, preferably a polymeric MDI (methylene diphenyl diisocyanate) based prepolymer. The second part of the adhesive, referred to as the "B-side," is a blend of elastomeric and flexible polyglycols. The adhesive of the present invention, formed by mixing the A-side and B-side components, is a frothing foam that has a consistency such that it does not run or drip when applied to the substrate, that expands upon application to the substrate surface to fill voids or imperfections, that collapses when the material to be bonded is placed in contact with the adhesive on the substrate, and that has a rapid cure time.

The method of the present invention includes the steps of: (1) providing an A-side prepolymer and a B-side blend, each containing a "soft" environmentally safe hydrofluorocarbon blowing agent, and also a means to mix and dispense the adhesive foam reaction product of the two components; (2) mixing the A-side and B-side components under low pressure and dispensing the adhesive foam onto a surface of a construction substrate; (3) allowing the adhesive foam to expand over the surface of the construction substrate and to initiate cell rupture; (4) placing the construction material to be bonded in contact with the adhesive foam on the surface of the construction substrate; and (5) allowing the adhesive foam to partially collapse and cure, forming a void-fling membrane that bonds the construction material to the construction substrate. The method of bonding provides for application of a single bead of adhesive or spraying of the adhesive to cover large surface areas.

BRIEF DESCRIPTION OF THE VIEWS OF THE DRAWINGS

In order to more fully understand the drawings referred to in the detailed description of the present invention, a brief description of each drawing is presented, in which.

DETAILED DESCRIPTION OF PREFERRED EMBODIMENT

Figure 1:
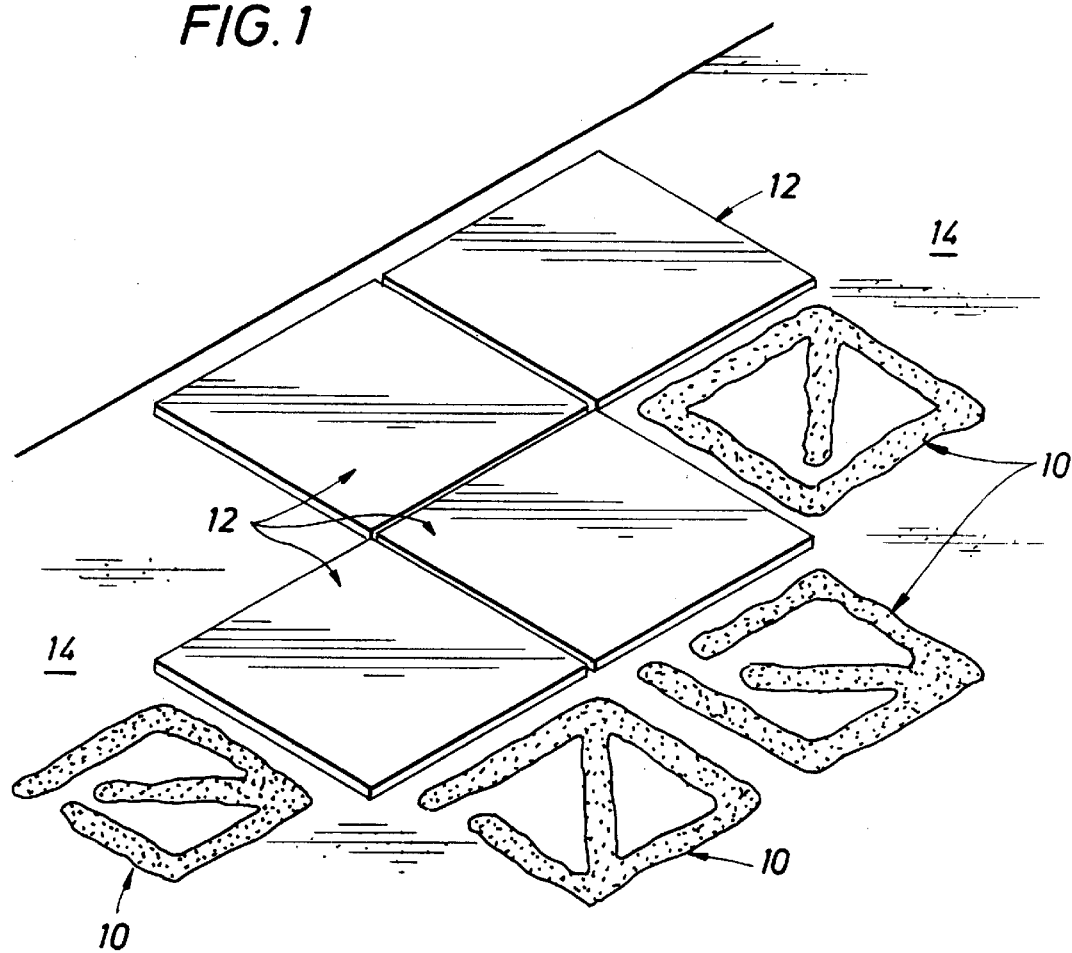
FIG. 1 is a perspective view of a portion of a tile or wood parkay flooring being installed on a wood or concrete subfloor using the present invention.

The present invention is a two component polyurethane adhesive and a method of bonding construction materials to various construction substrates. As used herein, "construction materials" refers generally to materials used in the construction of residential and commercial dwellings, and includes, but is not limited to, ceramic tiles, wood parkay flooring, drywall or exterior sheathing, decorative wall boards, decorative brick and stone, trim molding, wood subfloor, roof decking, asphalt roof shingles, a roof insulation board applied to wood, steel and concrete decks. As used herein, "construction substrates" generally refers to various structural or foundational surfaces encountered in the construction of residential and commercial dwellings and includes, but is not limited to, wood subfloors, concrete subfloors, studs, joists, rafters, shingles, wood, concrete blocks, steel and concrete decks.

The Adhesive

The adhesive of the present invention is the reaction product of two separate components that are mixed together immediately prior to application upon dispensing onto a substrate. The first part of the adhesive, referred to as the "A-side," is a polyisocyanate prepolymer, preferably a polymeric MDI (methylene diphenyl diisocyanate) based prepolymer. The second part of the adhesive, referred to as the "B-side," is a blend of elastomeric and flexible polyols.

The adhesive of the present invention, formed by mixing the A-side and B-side components, is a frothing foam that has a consistency such that it does not run or drip when applied to the substrate. This is particularly important when the adhesive is being used on a sloped surface, such as a pitched roof, or used overhead. The adhesive expands upon application to the substrate surface to fill voids or imperfections, and collapses when the material to be bonded is placed in contact with the adhesive. Additionally, the adhesive has a rapid cure time. Preferably, the adhesive of the present invention has a consistency similar to that of shaving creams and has a cure time in the range of six to twelve minutes. Preferably, the adhesive can expand between about 10% to about 50% of original volume to fill gaps, crevices, or uneven spots in the substrate or occurring between the materials to be bonded.

It is understood that when used herein, the composition percentages refer to weight percentages, unless otherwise stated. Additionally, when referring to a polyol by its molecular weight, the stated molecular weight is the nominal number average molecular weight. The actual average molecular weight can include a range above and below the nominal average molecular weight. Preferably, the actual average molecular weight of the polyols used in the present invention are within a range of about 300 MW units above or below the stated nominal molecular weights.

The preferred A-side prepolymer component is prepared by reacting a polymeric MDI with a polyether triol having an average molecular weight (MW) of about 1400, to which a flame retardant, and a soft hydrofluorocarbon as the primary blowing agent are added. A commercially acceptable polymeric MDI is available from the Bayer Corporation under the name Mondur 582, however, other commercially available polymeric MDI of similar characteristics can also be used. The preferred polyether triol used to form the A-side component is a nominal 1400 MW polyether polyol capped with ethylene oxide and having a minimum primary hydroxyl content of 70%. A commercially acceptable polyether triol is available from Olin Chemical as Poly-G-76-120 which has a hydroxyl number of 120 and which is generally used in non-foam urethanes such as coatings, sealants, elastomers, and adhesives. Other commercially available polyether triols of similar characteristics can also be used.

Acceptable flame retardants for use in the A-side prepolymer include Fryol PCF made by AKZO Chemical, Antiblaze 80 from Albright-Wilson or their commercial equivalents. The amount of flame retardant used is dependant upon the type used, however, generally, the amount of flame retardant used should be such that the cured adhesive will meet the flammability requirements of the intended application.

Acceptable primary blowing agents includes hydrogenated chlorofluorocarbon R22 (HCFC-R22) or hydrogenated fluorocarbon 134A (HFC-134A). CFC-R12 and similar "hard" HCFC's are not used due to their reported deleterious effects to the earth's ozone layer.

The preferred A-side prepolymer is produced in a manner such that there is about 10% to about 20% free NCO (isocyanate groups) in the prepolymer. Most preferably, there is between about 12% and about 15% free NCO. The preferred prepolymer can be produced by adding 100 parts of the preferred triol to a reactor equipped with a stirring means and a nitrogen blanket. Approximately 372 parts of polymeric MDI, with a functionality of about 2.7, is then added to the reactor and the components are reacted at a temperature between about 50° C. to about 70° C. until the prepolymer has between about 13% and about 23% free NCO. Between about 2% and about 10%, by weight, flame retardant is added and the mixture is allowed to cool to about 25° C. The cooled prepolymer is then transferred to a pressure vessel capable of withstanding at least 250 psi operating pressures. Soft hydrofluorocarbon is then added in an amount equal to about 6% to about 9% of the total mixture and blended into the prepolymer.

The preferred B-side component is prepared by blending together several polyether triols, and then adding a diol extender, a catalyst, an emulsifier, and a soft hydrofluorocarbon for use as a primary blowing agent. A preferred blend of polyether triols includes 6500 MW polyether triol, a 1000 MW polyether triol, and a 1400 MW polyether triol.

In the preferred blend of polyether triols used to form the B-side component the preferred 6500 MW triol is an ethylene oxide capped polyether triol having a primary hydroxyl content of about 78% and a hydroxyl number of about 27. A commercially acceptable 6500 polyether triol, Poly-G-85-29, is available from Olin Chemicals. This polyol was generally developed for use in RIM (reaction injection molding) processes, sealants, microcellular urethanes, cans and filled elastomers. Other commercially available polyether triols of similar characteristics can also be used.

The preferred 1000 MW triol is an oxypropylated polyether triol having a hydroxyl number of about 168 and approximately 100% secondary hydroxyl groups. A commercially acceptable 1000 polyether triol is available from Olin Chemical as Poly-G30-168. This polyol is generally used in froth foams, elastomers, and coating applications.

Other commercially available polyether triols of similar characteristics can also be used.

The 1400 MW triol is a highly reactive ethylene oxide capped polyether triol having a minimum primary hydroxyl content of about 70% and a hydroxyl number of about 120. A commercially acceptable 1400 polyether triol is available from Olin Chemical as Poly-G-76-120. This polyol has primarily been used in non-foam urethanes such as coatings, sealants, elastomers, and adhesives. Other commercially available polyether triols of similar characteristics can also be used.

Preferably, the B-side component includes about 20% to about 35% by weight of the 6500 MW triol, about 35% to about 50% of the 1000 MW triol, and about 15% to about 25% of the 1400 MW triol. More preferably, the B-side component includes about 25% to about 30% by weight of the 6500 MW triol, about 38% to about 45% of the 1000 MW triol, and about 18% to about 22% of the 1400 MW triol.

A diol extender, a catalyst, an emulsifier, and a soft hydrofluorocarbon are added to the blend of polyols forming the B-side component. A surfactant may also be added to this blend. Acceptable extenders include 1,4 butanediol (Butylene Glycol), diethylene glycol, and ethylene glycol as are commercially available from Ashland Chemical. Preferably, the B-side component is about 5% to about 15% diol extender. More preferably, the B-side component is about 7% to about 12% diol extender.

A catalyst such as organo tin, available from Witco Chemical, can be used in the B-side component. Preferably, the B-side component is about 0.02% to about 0.20% catalyst. More preferably, the B-side component is about 0.08% to about 0.15% catalyst. Other catalysts are acceptable for use such as are known by those skilled in the art.

Acceptable emulsifiers for use in the B-side component include: odorless mineral spirits as available from Ashland Chemical; propylene carbonate as available from Texaco; DBE (dibasic ester) as available from DuPont; and DB acetate, DE acetate, and TXIB plasticizer as available from Eastman Chemical. Preferably, the B-side component is about 1% to about 5% emulsifier. More preferably, the B-side component is about 2% to about 3% emulsifier.

Preferably, the soft hydrofluorocarbon blowing agent added to the B-side component is the same as that used in the A-side component. Preferably, the B-side component is about 1% to about 10% blowing agent. More preferably, the B-side component is about 6% to about 8% blowing agent.

The Method of Bonding

The method of the present invention includes the steps of: (1) providing an A-side polyisocyanate prepolymer component and a B-side polyol blend, each having a soft hydrofluorocarbon blowing agent, and also providing a means to mix and dispense the adhesive foam reaction product of the two components; (2) mixing the A-side and B-side components under low pressure and dispensing the adhesive foam onto the surface of a construction substrate; (3) allowing the adhesive foam to expand over the surface of the construction substrate and to initiate cell rupture; (4) placing the construction material to be bonded in contact with the adhesive foam on the surface of the construction substrate; and (5) allowing the adhesive foam to partially collapse and cure, forming a void-filling membrane that bonds the construction material to the construction substrate.

The method of the present invention preferably utilizes portable dispensing equipment capable of separately storing the two components until application is desired. The dispensing equipment should have a mixing head that adequately mixes the two components and the soft hydrofluorocarbon blowing agents prior to dispensing the adhesive foam. The portable equipment capable of dispensing the adhesive foam is known to those skilled in the art and is described more fully in U.S. Pat. No. 5,362,342, issued to Murray et. al, which is hereby incorporated by reference in its entirety. Examples of portable dispensing equipment acceptable for use in the method of bonding of the present invention include the Foampro® equipment or the Pro-Pack™ kits available through Polyfoam Products, Inc., Spring, Tex.

The soft hydrofluorocarbons contained in both the A-side and B-side components are important to the method of the present invention. The soft hydrofluorocarbon, HFC 134a for example, aids in mixing and acts as a mechanical frothing agent. The use of an environmentally safe "soft" blowing agents, such as HCFC R-22 or HFC 134a, to mix and mechanically froth the construction adhesive during dispensing contributes to the ability to successfully operate at low pressures.

During the step of mixing and dispensing, the soft hydrofluorocarbon that acts as the primary blowing agent and which is a gas under pressure, expands as soon as it enters the mixing chamber on the dispensing equipment. The expansion of the blowing agent creates pressure and turbulence that aids in mixing. The mixed components, when exiting the dispensing gun, should have sufficient body or viscosity to prevent the adhesive foam from migrating away from the placement point.

The ProPack™ disposable kits which can be used to dispense adhesive according to the present invention utilize a static mixer having a bladed element placed within a small bore tube which causes the two components to change direction and fold together as they pass through the tube. These kits do not require the use of additional compressed air at the mixing nozzle to aid in mixing as do many types of dispensing and mixing equipment known to those skilled in the art.

In the method of the present invention, the mixing of the components can occur under low pressure. Depending upon the particular dispensing equipment utilized, the two components can be mixed at pressures of about 400 psi or lower. When utilizing the ProPack™ disposable kits, an initial pressure of about 340 psi is generally used to mix the components. Acceptable mixing of the A-side and B-side components can even be obtained at 100 psi and lower due to the froth technology. For comparison purposes, prior art methods of mixing polyurethane components typically required pressures of about 800 to 2000 psi in order to achieve proper mixing.

The adhesive foam of the present invention can be dispensed in a single bead, a single spot or dot, or can be sprayed over a large area depending upon the items being bonded. Preferably, the adhesive foam is applied at a rate of about 0.5 to about 15.0 pounds per minute depending upon the particular application.

The reaction product of the two components is a froth liquid polyurethane adhesive foam. In the preferred method, the froth foam has an initial consistency similar to a foamy shaving cream. The froth adhesive foam is preferable over other types of foams because it can be neatly and accurately dispensed from the foam dispensing gun without blowing or overspraying onto areas of the substrate not to be bonded. The adhesive of the present invention with the shaving cream consistency does not run when placed onto steeply pitched substrates, such as a wall or rooftop, but remains where it is installed on the substrate. This ensures that the adhesive bond will be formed along the entire length of the substrate when the adhesive is so applied.

Upon dispensing, a reaction continues in which heat is generated due to the exothermic reaction of the components within the adhesive foam that aids the remaining hydrofluorocarbon to form bubbles or cells in the dispensed foam. This reaction causes the adhesive foam to begin expanding upon application to the construction substrate. This expansion is a particularly advantageous feature of the construction adhesive and the method of bonding of the present invention. The expansion of the adhesive foam allows gaps, crevices, and other imperfections to be filled.

The adhesive foam continues reacting until the cell structures become very coarse and cell rupture or collapse is initiated. The construction material is then placed in contact with the adhesive foam. Placing the construction material in contact with the adhesive foam causes further rupture of the cell structure of the adhesive foam and the foam partially collapses into a void-filling membrane. At this point in the reaction profile, the adhesive is building viscosity at a rapid rate and will conform to the thickness of whatever space is provided. It is important that the construction material and the construction substrate be properly placed relative to one another while the adhesive foam continues to react in order for the foam to collapse into the void-filling membrane.

The adhesive foam should be allowed to expand for between about 15 to about 120 seconds to allow cell rupture to begin before placing the construction material in contact with the adhesive foam. Preferably, the adhesive foam should be allowed to expand for at least about 30 seconds before placing the construction material in contact with the adhesive. Generally, no longer that about 120 seconds should elapse before the construction material is placed in contact with the adhesive foam. Preferably, no longer than about 60 seconds are allowed to elapse.

The two component polyurethane adhesive used in this method should have a rapid cure rate. Generally, the adhesive should cure within about 4 to about 10 minutes. Preferably, the adhesive should cure in about 6 to about 8 minutes providing for fast application. The rapid cure rate of the adhesive used in the method of the present invention eliminates the problems resulting from long cure times, typically several hours, normally associated with single component polyurethane adhesives. However, the cure time is not too short to timely place the elements to be bonded in proper position. Importantly, the rapid cure time of the two component polyurethane adhesive does not affect the bond strength between surfaces.

Another advantage of the method of the present invention is that it utilizes a reactive adhesive mechanism rather than an evaporative adhesive mechanism. Therefore, no solvents are necessary in the present invention such as chlorinated hydrocarbons or ketone based solvents which are typically used in other construction adhesives. This makes the method of the present invention more environmentally "friendly".

The adhesive and method of bonding of the present invention provide excellent bonding between two surfaces due to the adhesive properties of the urethane. The adhesive and the method of bonding of the present invention provide some elasticity to the bonded surfaces which allows for some movement between the substrate and the material. The two-component polyurethane adhesive is water proof, semi-flexible, and odorless. In addition, since the two adhesive components are separated until they are dispensed for use, this adhesive product is storage stable for about eighteen months or longer. Furthermore, the manufacture of a two component system and the low cost delivery system of the adhesive makes the present invention cost competitive with current adhesive systems such as those dispensed from caulking guns. Additionally, the fact that the entire system can be made portable is also a significant advantage.

The following examples disclose particular preferred embodiments of the present invention, but are not intended to limit the scope of either the adhesive or the method of bonding.

EXAMPLE 1

In one preferred embodiment, the present invention provides a method for adhesion of tiles 12 bonded in surface-to-surface contact with a subfloor substrate 14 such as concrete (FIG. 1). The adhesive 10 of the present invention is applied in a stream on the concrete floor substrate. The consistency of the adhesive 10 allows it to remain where applied without running onto areas not desired to be bonded. At this point, the adhesive 10 has a reactivity period of about six to about eight minutes during which the adhesive 10 must come into contact with the ceramic tiles 12 in order for these tiles 12 to be bonded to the floor substrate 14.

Upon application of the tiles 12 to the foam adhesive, the foam bubbles burst causing the foam to collapse into a thin, adhesive membrane. The combination of the expanding and collapsing nature of the foam during the reactivity period, allows gaps and imperfections between the two surfaces to be filled by the adhesive 10. This is a highly desirous property of the adhesive 10 as it allows irregularly shaped or non-planar tiles 12 to be completely bonded to the floor substrate 14 preventing the undesired rocking motion often exhibited by irregularly shaped tiles 12 not completely bonded to the surface substrate 14. Once the adhesive 10 cures, the tiles 12 are bonded to the floor substrate 14.

EXAMPLE 2

Figure 2:
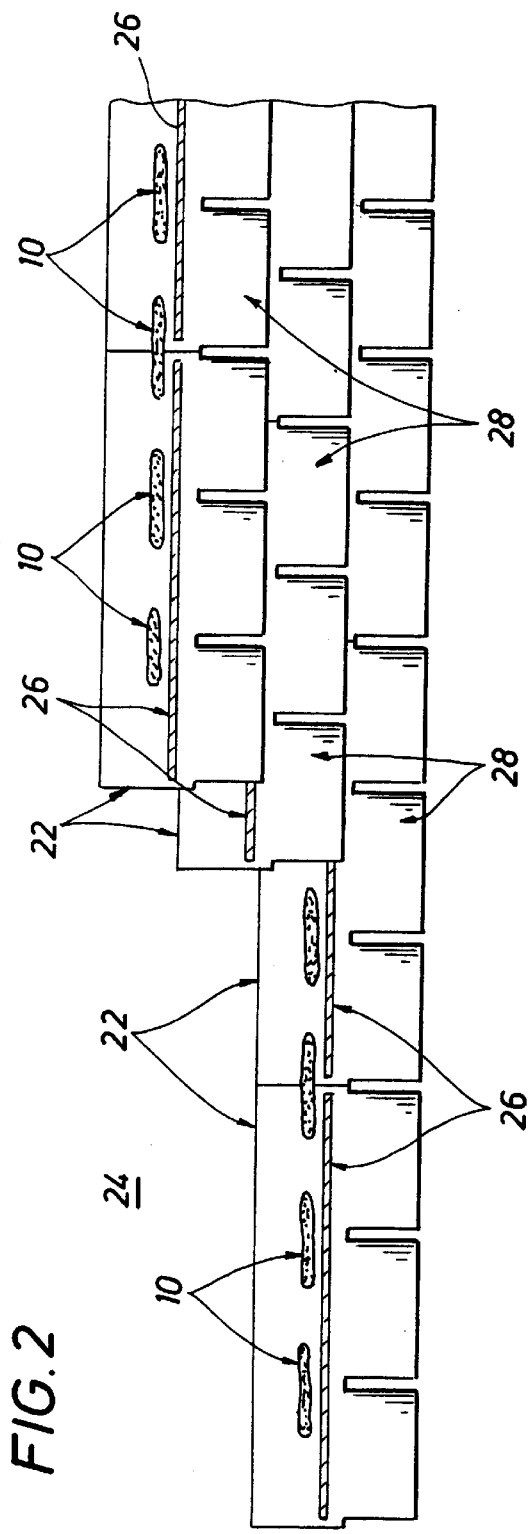
FIG. 2 is a top view of typical roof shingles being installed in an overlapping fashion on a roof substrate using the present invention.

In another preferred embodiment, the present invention provides a method for adhesion of asphalt shingles 22 to a roof substrate 24 (see FIG. 2). Asphalt shingles 22 are particularly vulnerable to damage in high wind areas such as found in coastal terrain. Although shingle manufacturers provide a method of adhering the shingle tabs 28 using a bitumen heat activated strip 26, the bond provided by this strip 26 is not sufficient to prevent the asphalt shingles 22 from tearing loose during a high wind event such as a hurricane. The application of a small bead of the two component adhesive 10 of the present invention beneath the shingle tab 28 provides the bond necessary to greatly reduce or eliminate shingle tear off during high wind events.

EXAMPLE 3

Figure 3:
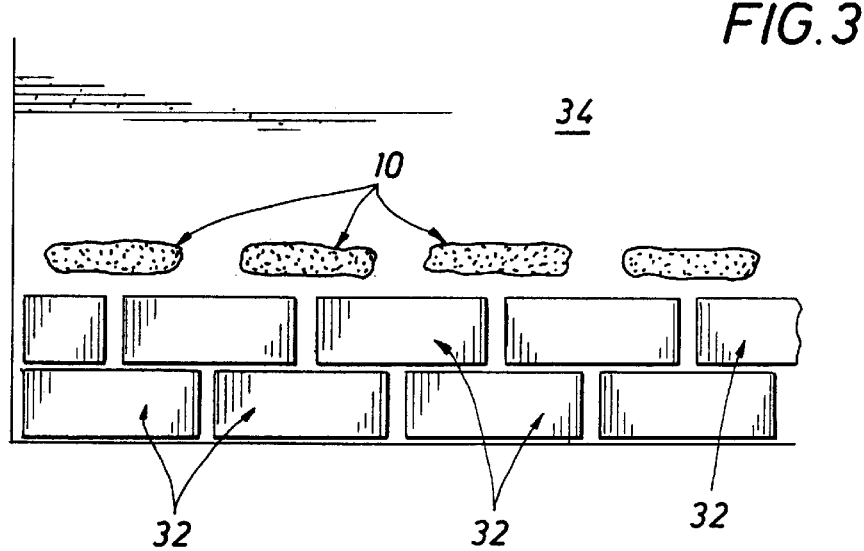
FIG. 3 is a side view of decorative brick being installed on a wall substrate using the present invention.

In another preferred embodiment, the present invention provides for a method for adhesion of decorative bricks 32 to an appropriate wall substrate 34 (see FIG. 3). The fast cure rate allows for rapid installation while the flexible bond characteristics allow for substrate movement.

EXAMPLE 4

Figure 4:
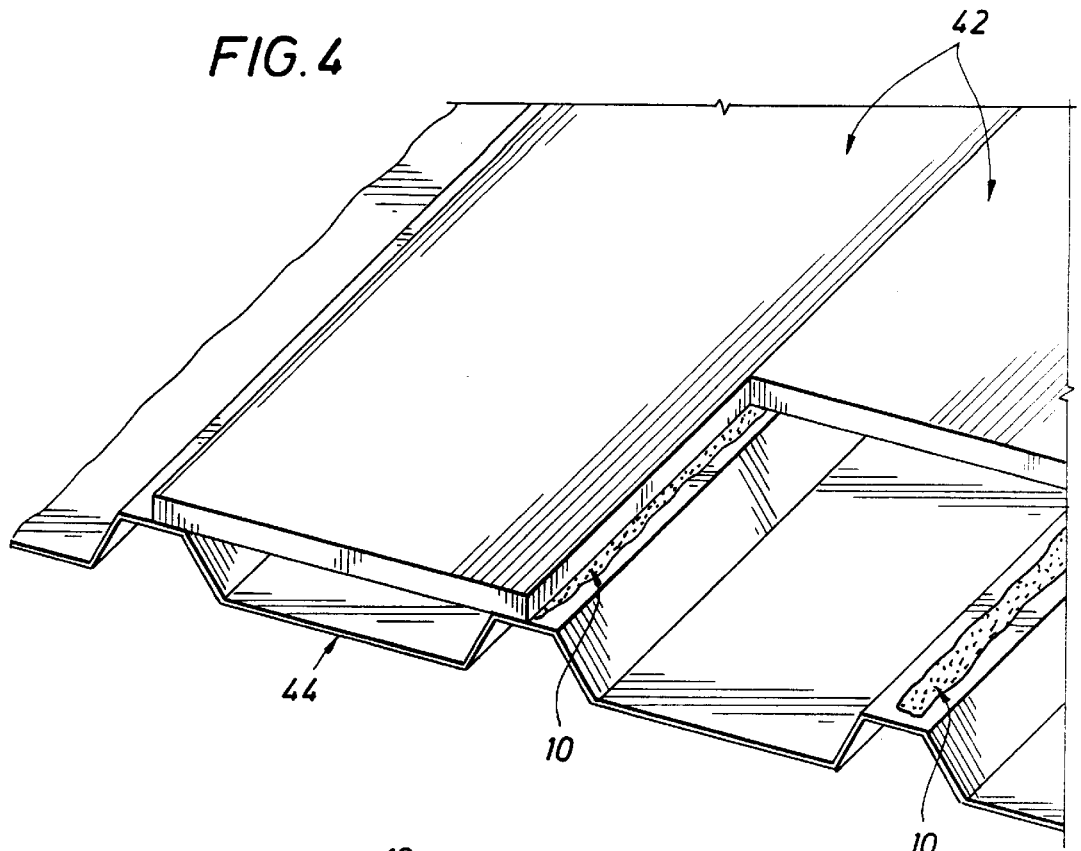
FIG. 4 is a perspective view of typical roof insulation boards being installed on a steel deck using the present invention.

In yet another preferred embodiment, the present invention provides for a method for adhesion of a roof insulation board 42 to a wood, concrete or steel deck 44 (see FIG. 4). The advantages of the present invention include fewer or no mechanical fasteners and a rapid cure rate. In addition, unlike single component urethane adhesion systems, the adhesion system of the present invention will not expand and move the roof boards 42.

EXAMPLE 5

Figure 5:
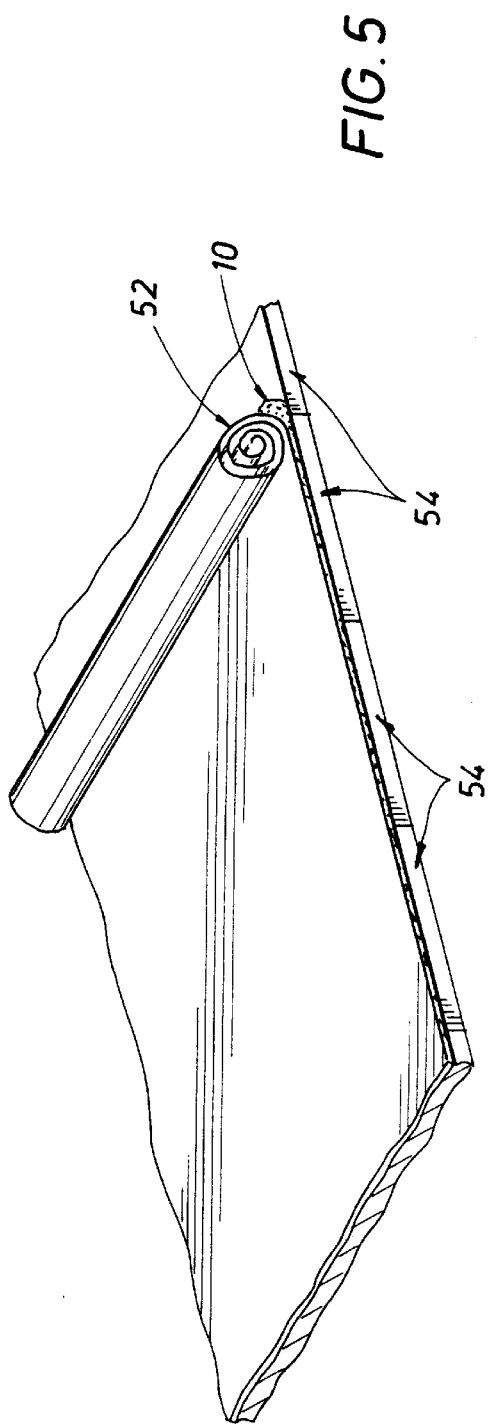
FIG. 5 is a perspective view of a typical roofing membrane being installed on an insulation board using the present invention.

In another preferred embodiment, the present invention provides for a method of adhesion of a roof membrane 52 to insulation boards 54 (FIG. 5).

EXAMPLE 6

Figure 6:
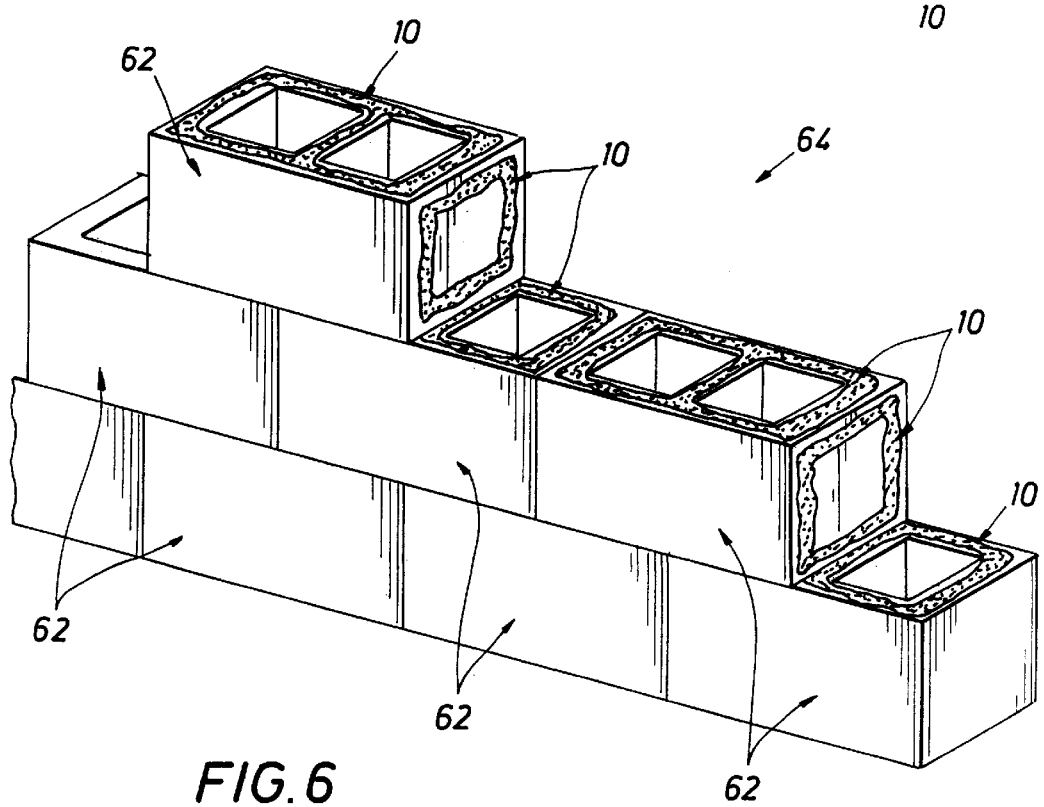
FIG. 6 is a perspective view of a concrete block wall installation using the present invention.

In another preferred embodiment, the present invention provides for a method of adhesion of cement blocks 62 (cinder blocks) commonly used in building wall 64 construction (FIG. 6). Prior art methods of using mortar to provide adhesion is very labor intensive. Additionally, any movement of the constructed wall 64 caused by settling can cause the mortar joint to crack and reduce the integrity of the wall. The adhesive 10 of the present invention provides some flexibility that can prevent joint failure.

The foregoing disclosure and description of the invention are illustrative and explanatory thereof, and various changes in the details of the illustrated adhesive and method of bonding may be made without departing from the spirit of the invention.

What is claimed is:

1. A method of bonding construction materials, the method comprising the steps of:

providing an isocyanate prepolymer, a polyether polyol blend, a soft hydrofluorocarbon blowing agent, and an apparatus for mixing and dispensing an adhesive reaction product of the prepolymer and the blend;

mixing the prepolymer and the blend under low pressure using the apparatus and dispensing a frothing foam adhesive onto a surface of a substrate;

allowing the foam adhesive to react and expand on the surface;

placing a construction material in contact with the foam adhesive on the surface of the substrate; and allowing sufficient cell ruptures to cause the foam adhesive to collapse into a void-filling membrane which bonds the construction material to the substrate.

2. The method of claim 1, wherein the mixing step comprises mixing the prepolymer and the blend at a pressure below about 400 pounds per square inch.

3. The method of claim 1, wherein after the mixing step, the method further comprises the step of:

allowing the foam adhesive to react until cell ruptures are initiated.

4. The method of claim 1, wherein the foam adhesive has a consistency that prevents migration across the substrate.

5. The method of claim 1, wherein the foam adhesive is allowed to react and expand for between about 15 seconds and about 120 seconds after dispensing before the construction material is placed in contact with the foam adhesive.

6. The method of claim 1, wherein the foam adhesive is allowed to react and expand by between about 10% and about 50% by volume.

7. The method of claim 1, wherein the foam adhesive is dispensed as a single bead.

8. The method of claim 1, wherein the apparatus for mixing and dispensing the adhesive comprises a portable apparatus.

9. The method of claim 1, wherein the isocyanate prepolymer provided is the reaction product of polymeric MDI and a polyether triol; the reaction product having between about 10% and about 20% excess free isocyanate groups, and wherein the polyol blend comprises a mixture of three polyether triols.

10. The method of claim 1, wherein the adhesive cures in between about 4 to about 10 minutes after dispensing.

11. A method of bonding construction materials, the method comprising the steps of:

providing an isocyanate prepolymer, a polyether polyol blend, a soft hydrofluorocarbon blowing agent, and an apparatus for mixing and dispensing an adhesive reaction product of the prepolymer and the blend;

mixing the prepolymer and the blend under low pressure using the apparatus and dispensing a frothing foam adhesive onto a surface of a substrate;

allowing the foam adhesive to react and expand on the surface;

placing a construction material in contact with the foam adhesive on the surface of the substrate;

allowing the foam adhesive to partially collapse and form a void-filling membrane bonding the construction material to the substrate; and wherein the polyol blend comprises a first polyol having a nominal molecular weight of about 6500, a second polyol having a nominal molecular weight of about 1000, and a third polyol having a nominal molecular weight of about 1400.

12. The method of claim 11, wherein the mixing step comprises mixing the prepolymer and the blend at a pressure below about 400 pounds per square inch.

13. The method of claim 11, wherein after the mixing step, the method further comprises the step of:

allowing the foam adhesive to react until cell ruptures are initiated.

14. The method of claim 11, wherein the foam adhesive has a consistency that prevents migration across the substrate.

15. The method of claim 11, wherein the foam adhesive is allowed to react and expand for between about 15 seconds and about 120 seconds after dispensing before the construction material is placed in contact with the foam adhesive.

16. The method of claim 11, wherein the foam adhesive is allowed to react and expand by between about 10% and about 50% by volume.

17. The method of claim 11, wherein the foam adhesive is dispensed as a single bead.

18. The method of claim 11, wherein the apparatus for mixing and dispensing the adhesive comprises a portable apparatus.

19. The method of claim 11, wherein the isocyanate prepolymer provided is the reaction product of polymeric MDI and a polyether triol; the reaction product having between about 10% and about 20% excess free isocyanate groups.

20. The method of claim 11, wherein the adhesive cures in between about 4 to about 10 minutes after dispensing.

21. The method of claim 11, wherein the first polyol is a triol capped with ethylene oxide having a primary hydroxyl content of at least about 70%; the second polyol is a oxypropylated polyether triol; and the third polyol is an ethylene oxide capped triol having a minimum primary hydroxyl content of about 70%.

22. The method of claim 11, wherein about 20% to about 35% by weight of the polyol blend is the first polyol, about 35% to about 50% by weight of the blend is the second polyol, and about 15% to about 25% by weight of the blend is the third polyol.

* * * * *